No. 712,826. Patented Nov. 4, 1902.
W. MASON.
COMBINED PERCUSSION AND ELECTRIC PRIMER.
(Application filed June 9, 1902.)
(No Model.) 2 Sheets—Sheet 1.
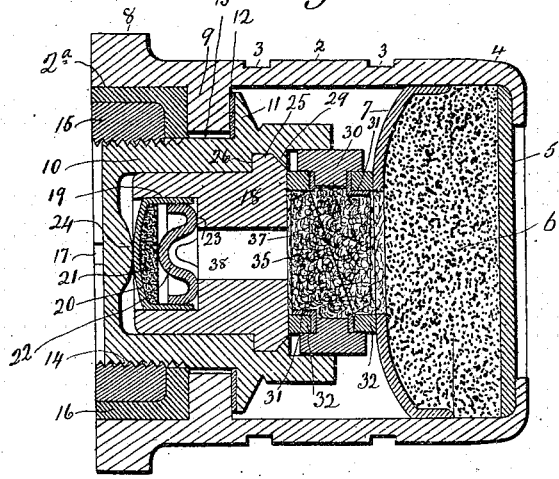
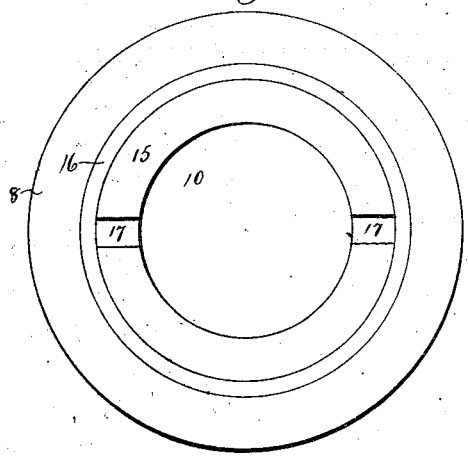
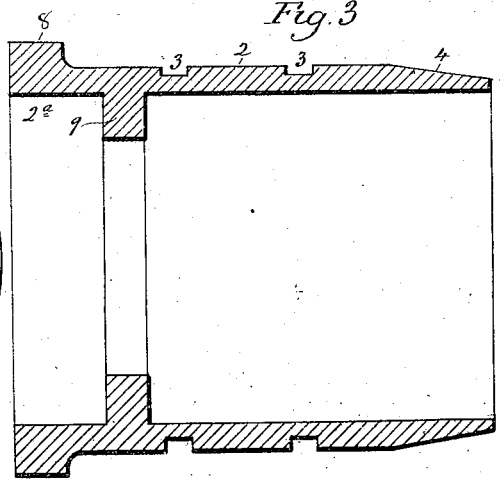
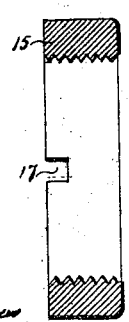
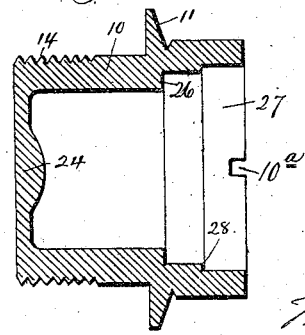
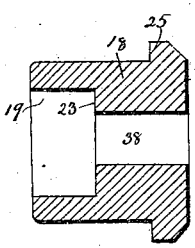

No. 712,826. Patented Nov. 4, 1902.
W. MASON.
COMBINED PERCUSSION AND ELECTRIC PRIMER.
(Application filed June 9, 1902.)
(No Model.) 2 Sheets—Sheet 2.
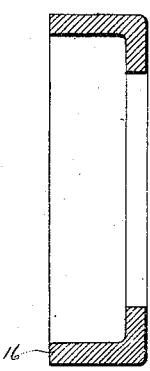
Fig. 7
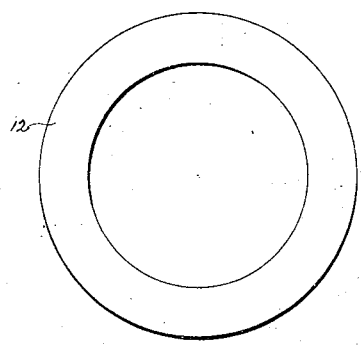
Fig. 8
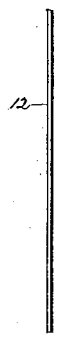
Fig. 9
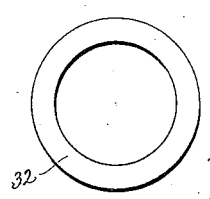 
Fig. 10  Fig. 11
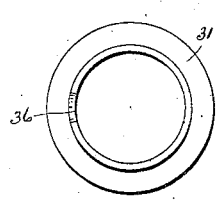 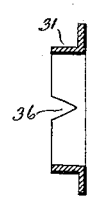
Fig. 12  Fig. 13
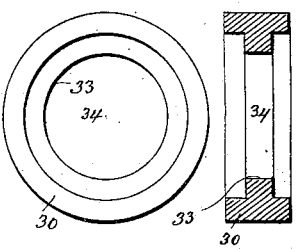 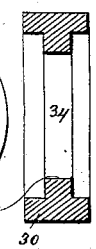
Fig. 14  Fig. 15
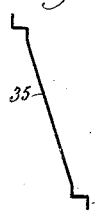
Fig. 16
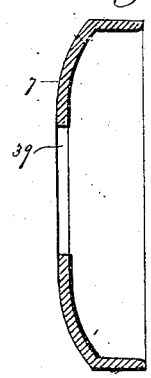
Fig. 17

UNITED STATES PATENT OFFICE.

WILLIAM MASON, OF NEW HAVEN, CONNECTICUT, ASSIGNOR TO WINCHESTER REPEATING ARMS CO., OF NEW HAVEN, CONNECTICUT, A CORPORATION.

COMBINED PERCUSSION AND ELECTRIC PRIMER.

SPECIFICATION forming part of Letters Patent No. 712,826, dated November 4, 1902.

Application filed June 9, 1902. Serial No. 110,733. (No model.)

*To all whom it may concern:*

Be it known that I, WILLIAM MASON, of New Haven, in the county of New Haven and State of Connecticut, have invented a new and useful Improvement in a Combined Percussion and Electric Primer; and I do hereby declare the following, when taken in connection with the accompanying drawings and the numerals of reference marked thereon, to be a full, clear, and exact description of the same, and which said drawings constitute part of this specification, and represent, in—

Figure 1, a view in longitudinal section of my improved primer; Fig. 2, a view in elevation of the breech end of the primer; Fig. 3, a detached sectional view of the primer-shell as it appears before its muzzle end is crimped for retaining the powder-wad; Fig. 4, a detached sectional view of the receiving-cup; Fig. 5, a corresponding view of the anvil-block; Fig. 6, a corresponding view of the receiving-cup nut; Fig. 7, a corresponding view of the cup-like insulating-washer employed to insulate the receiving-cup nut from the shell of the primer; Fig. 8, a plan view of the mica washer employed to insulate the receiving-cup from the shell; Fig. 9, an edge view thereof; Fig. 10, a plan view of one of the two copper contact-rings of the electric primer; Fig. 11, a sectional view thereof; Fig. 12, a plan view of one of the flanged copper contact-washers of the electric primer; Fig. 13, a sectional view thereof; Fig. 14, a plan view of the doubly-cupped receiving-ring of the electric primer; Fig. 15, a sectional view thereof; Fig. 16, a detached view of the fusible-wire bridge of the electric primer; Fig. 17, a sectional view of the powder-cup of the combined primer.

My invention relates to an improvement in that class of primers adapted to be fired either by percussion or by an electric current and known in the art as "combined percussion and electric primers," the object of the present invention being to produce a simple, compact, reliable, and sensitive primer constructed with particular reference to avoiding the escape of gas either by leakage between the parts or through piercing by the firing-pin.

With these ends in view my invention consists in a combined percussion and electric primer having certain details of construction and combinations of parts, as will be hereinafter described, and pointed out in the claims.

In carrying out my invention as herein shown I employ a brass primer shell or body 2, formed with the usual gas-check cannelures 3 and having its forward or muzzle end beveled, as at 4, to adapt it to be readily crimped for the retention of the disk-shaped powder-wad 5, employed to confine a charge of powder 6 in the muzzle end of the primer-shell 2, which receives a sheet-metal powder-cup 7. The rear or breech end of the shell 2 is formed with a rim or head 8, which locates the primer in the cartridge-shell, which is formed in the usual manner with a recess for the reception of the said rim or head. Toward its breech end the said shell is formed with an internally-arranged abutment-ring 9, the circular central opening of which is sufficiently large to receive a brass receiving-cup 10, formed with a circumferential forwardly-beveled gas-check flange 11, the flat rear face of which bears upon a mica washer 12, placed against the forward face of the abutment-ring 9 aforesaid, whereby the said receiving-cup 10 is insulated from the shell 2. By reference to Fig. 1 it will be seen that an insulating-space 13 is formed between the said abutment-ring 9 and the periphery of the cup 10, which is made a trifle smaller in external diameter than the internal diameter of the said abutment-ring, so as to produce the said space 13, which is necessary to the insulation of the cup from the shell. The said cup 10 has its rear end externally threaded, as at 14, for the application to it of an internally-threaded receiving-cup nut 15, which is insulated from the shell 2 by means of a cup-like washer 16, made of vulcanized fiber or other equivalent material, fitting into a recess 2ª, formed in the breech end of the shell 2 and bearing at its inner end directly against the rear face of the abutment-ring 9 thereof. The outer face of the nut 15 is formed with two notches 17, placed opposite each other and provided for the reception of a key by which the nut is turned, so as to firmly bind in place the receiving-cup 10, which is formed at its forward end with notches 10ª for the reception of a key to hold the cup against rotation while the nut 15 is being turned home, or vice versa. The rear or breech end of the cup 10 receives an independently-formed brass anvil-block 18, the rear end of which is formed with a chamber 19 for the reception of a percussion-primer of any approved construction and comprising, as herein shown, a cup 20, containing a charge of priming mixture 21 and an anvil 22, the center of which rests against the mixture. The anvil 22, it will be observed, projects slightly before the edge of the cup 20, so as to rest upon the bottom of the said chamber 19 at the point 23, as seen in Figs. 1 and 5. The center of the crowning bottom of the cup 20 is in contact with an integral forwardly-projecting firing-boss 24, located in the center of the bottom of the receiving-cup 10. This boss 24 thickens and reinforces the said receiving-cup and makes it less liable to be pierced by the firing-pin and also insures the explosion of the percussion-primer in case the firing-pin strikes its blow to one side of the precise center of the said cup. The anvil-block 18 is positioned in the receiving-cup 10 by its provision at its forward end with a rib or flange 25, bearing against the bottom wall 26 of the enlarged chamber 27, formed in the forward end of the cup 10, in which the block is securely held by upsetting a shoulder 28, formed within the said cup, against the beveled forward edge of the rib or flange 25 of the anvil-block 18. This is done by a suitable punch and results in the formation of a retaining-flange 29. (Clearly shown in Fig. 1.)

The electrical primer of my improved combined primer is located within the chamber 27 of the receiving-cup 10 and comprises a doubly-cupped non-conducting receiving-ring 30, formed of boxwood or equivalent insulating material, two copper contact-washers 31, and two copper contact-rings 32. The said contact-washers are snapped into the opposite ends of the ring 30, so as to bring their flanges into engagement with the opposite faces of the central rib 33 thereof. The opening 34 of the said ring 30 is traversed diagonally by a fusible-wire bridge 35, made from iridio-platinum wire, the ends of which are bent to adapt them to be passed through deep clearance-notches 36, formed in the contact-washers 31, so as to permit the bent ends of the wire to make contact with the outer faces of the flanges of the said washers. After the bridge 35 and the washers have been assembled in the ring 30 the contact-rings 32 are introduced into the opposite ends thereof, whereby the ends of the bridge 35 are firmly pinched between the respective contact-washers 31 and contact-rings 32; but the contact ring and washer on one side of the receiving-ring 30 are insulated from the contact ring and washer on the other side thereof, except for the bridge 35. After the said parts have been assembled the space within the receiving-ring 30, the contact-ring 32, and the contact-washers 31 is filled with gun-cotton 37.

A flash-hole 38, formed in the anvil-block 18, leads from the percussion-primer already described to the guncotton 37, while a flash-hole 39, formed in the powder-cup 7, leads from the guncotton to the charge of powder 6 in the cup 7.

It will now be understood that the rear end of the bridge 35 of the electric primer is insulated from the shell 2 by the mica washer 12 and by the cup-like washer 16 and that the forward end of the said bridge is in electric connection with the shell through the forward contact-ring 32 and the powder-cup 7, which bears against it and fits within the forward end of the primer-shell 2, which will make contact with the cartridge-shell, which will in turn make contact with the gun-barrel, to which the current is in some well-known way led. The current is also led in some well-known way to some portion of the breech-block or firing-pin, whereby a current is sent through the bridge 35, which fuses and ignites the guncotton.

It is apparent that in carrying out my invention some changes from the construction herein shown and described may be made. I would therefore have it understood that I do not limit myself to such construction, but hold myself at liberty to make such departures therefrom as fairly fall within the spirit and scope of my invention.

Having fully described my invention, what I claim as new, and desire to secure by Letters Patent, is—

1. In a combined percussion and electric primer, the combination with a shell or body, of a receiving-cup located entirely therein and insulated therefrom, an independently-formed anvil-block located entirely within the said receiving-cup and having a chamber in its breech end, a percussion-primer located within the said chamber in the breech end of the anvil-block, and an electric primer entered into the forward end of the said receiving-cup and located directly in front of the said anvil-block which is formed with a flash-hole connecting the two primers.

2. In a combined percussion and electric primer, the combination with a shell or body formed with an integral, internally-arranged abutment-ring, of a receiving-cup located within the said shell and formed with a gas-check flange bearing against the forward face of the abutment-ring from which it is insulated, a receiving-cup nut applied to the breech end of the cup, a cup-like insulating-washer located in the breech end of the shell and receiving the said nut, an independently-formed chambered anvil-block located within the said cup, a percussion-primer located within a chamber in the breech end of the said anvil-block, and an electric primer mounted in the forward end of the said cup.

3. In a combined percussion and electric primer, the combination with a shell or body, of a receiving-cup located therein and insulated therefrom, an independently-formed chambered anvil-block located within the said cup and formed at its forward end with a rib or flange bearing upon a shoulder within the said cup, a percussion-primer located within the breech end of the said block, and an electric primer located in front of the said percussion-primer.

4. In a combined percussion and electric primer, the combination with a shell or body formed with an integral, internally-arranged abutment-ring, of a receiving-cup having its rear end threaded and formed with a circumferential gas-check flange bearing against the forward face of the said ring from which it is insulated, of a receiving-cup nut applied to the threaded rear end of the said cup for drawing the gas-check flange against the said ring, a cup-like insulating-washer located in a recess in the breech end of the shell and receiving the said nut, which it insulates from the shell, an independently-formed chambered anvil-block located within the cup and provided with a positioning rib or flange which bears upon a shoulder within the cup, a percussion-primer located within the chamber in the breech end of the said block, an electric primer located directly in front of the said block which is formed with a flash-hole leading from the percussion-primer to the electric primer, and a powder-cup located in the forward end of the shell.

5. In a combined percussion and electric primer, the combination with a shell or body, of a receiving-cup located therein and insulated therefrom, and having its closed breech end formed with an integral, centrally-arranged, forwardly-projecting firing-boss, an independently-formed anvil-block located within the said cup, a percussion-primer located within the breech end of the said block in position for coaction with the said firing-boss, and an electric primer located directly in front of the said block which is formed with a flash-hole leading from the percussion-primer to the electric primer.

In testimony whereof I have signed this specification in the presence of two subscribing witnesses.

WILLIAM MASON.

Witnesses:
DANIEL H. VEADER,
H. S. LEONARD.